United States Patent [19]

King et al.

[11] Patent Number: 5,199,672
[45] Date of Patent: Apr. 6, 1993

[54] METHOD AND APPARATUS FOR DEPLOYING A SATELLITE NETWORK

[75] Inventors: Jan A. King; Neal J. Beidleman, both of Boulder, Colo.

[73] Assignee: Orbital Sciences Corporation, Fairfax, Va.

[21] Appl. No.: 529,395

[22] Filed: May 25, 1990

[51] Int. Cl.⁵ ............................................. B64G 1/10
[52] U.S. Cl. ................................ 244/158 R; 244/164
[58] Field of Search .................. 244/158 R, 164, 167, 244/169, 171, 172, 165; 342/352, 355, 356

[56] References Cited

U.S. PATENT DOCUMENTS

| | | | |
|---|---|---|---|
| 3,341,151 | 9/1967 | Kampinsky | 244/1 |
| 3,380,687 | 4/1968 | Wrench et al. | 244/158 R |
| 3,420,470 | 1/1969 | Meyer | 244/158 R |
| 3,836,969 | 9/1974 | Bond et al. | 343/100 ST |
| 4,084,772 | 4/1978 | Muhlfelder | 244/165 |
| 4,502,051 | 2/1985 | Dondl | 343/356 |
| 4,599,619 | 7/1986 | Keigler et al. | 343/352 |
| 4,613,864 | 9/1986 | Hofgen | 343/357 |
| 4,657,210 | 4/1987 | Hubert et al. | 244/158 R |
| 4,776,540 | 10/1988 | Westerlund | 244/164 |
| 4,854,527 | 8/1989 | Draim | 244/158 R |
| 4,901,949 | 9/1990 | Elias | 244/49 |
| 4,943,014 | 7/1990 | Harwood et al. | 244/158 R |

FOREIGN PATENT DOCUMENTS

| | | | |
|---|---|---|---|
| 3002551 | 7/1981 | Fed. Rep. of Germany | 244/158 R |
| 8901437 | 2/1989 | PCT Int'l Appl. | 244/158 R |

OTHER PUBLICATIONS

T. Izumisawa, S. Samejima and M. Shibyama, "A Control Method of Antenna Pointing Error Due to Orbital Inclination for A Spin-Stabilized Satellite," Oct. 10–15, 1983, pp. 1–7, 34th Congress of the International Astronautical Federation.
H. E. Rowe and Arno A. Penzias, "Efficient Spacing of Synchronous Communication Satellites," Dec. 1968, pp. 2379–2433, Bell System Technical Journal.
C. W. Lundgren, "A Satellite System for Avoiding Serial Sun-Transit Outages and Eclipses," Oct. 1970, pp. 1943–1972, Bell System Technical Journal.
W. S. Adams and L. Rider, "Circular Polar Constellations Providing Continuous Single or Multiple Coverage Above a Specified Latitude," Journal of the Astronautical Sciences, vol. 35, pp. 155–192 Apr.–Jun. 1987.
J. R. Wertz, ed., "Spacecraft Attitude Determination and Control," 1978, D. Reidel (Boston), Chapter 3, written by J. R. Wertz, Chapter 10 written by L. C. Chen and J. R. Wertz, Chapter 12, written by F. L. Markey and G. Lerner and Appendix 1, compiled by A. K. Saxena.
A. E. Roy, "Orbital Motion," (3rd Ed. 1988), pp. 26–40, Adam Hilger (Philadelphia).

Primary Examiner—Charles A. Marmer
Assistant Examiner—Carla Mattix
Attorney, Agent, or Firm—Jenner & Block

[57] ABSTRACT

The effect of orbit plane precession is used to place a plurality of satellites into one or more desired orbit planes. The satellites are distributed within each desired orbit plane in a selected configuration. The satellites are transported into orbit on one or more frame structures referred to as "pallets". When more than one pallet is used, they are placed on top of each other in a "stack". After the stack of the pallets has been launched into an initial, elliptical orbit, the pallets are separated sequentially from the stack at selected time intervals. Thrust is applied to transfer a first pallet from the initial orbit to a first, circular orbit, wherein the initial and first orbits are in planes that process at different predetermined initial and first rates, respectively. After waiting for a predetermined time while the initial orbit plane and the first orbit plane precess with respect to each other, thrust is applied to the next pallet to transfer it into a next, circular orbit in a next orbit plane, wherein the precession rate of the next orbit plane also is different from the initial precession rate of the initial orbit plane. The foregoing step is repeated until the satellites on the respective pallets have been sequentially deployed into the desired orbit planes. The satellites on each pallet are then separated from the pallet simultaneously, but at different rates to achieve separation among the satellites within each orbit.

36 Claims, 13 Drawing Sheets

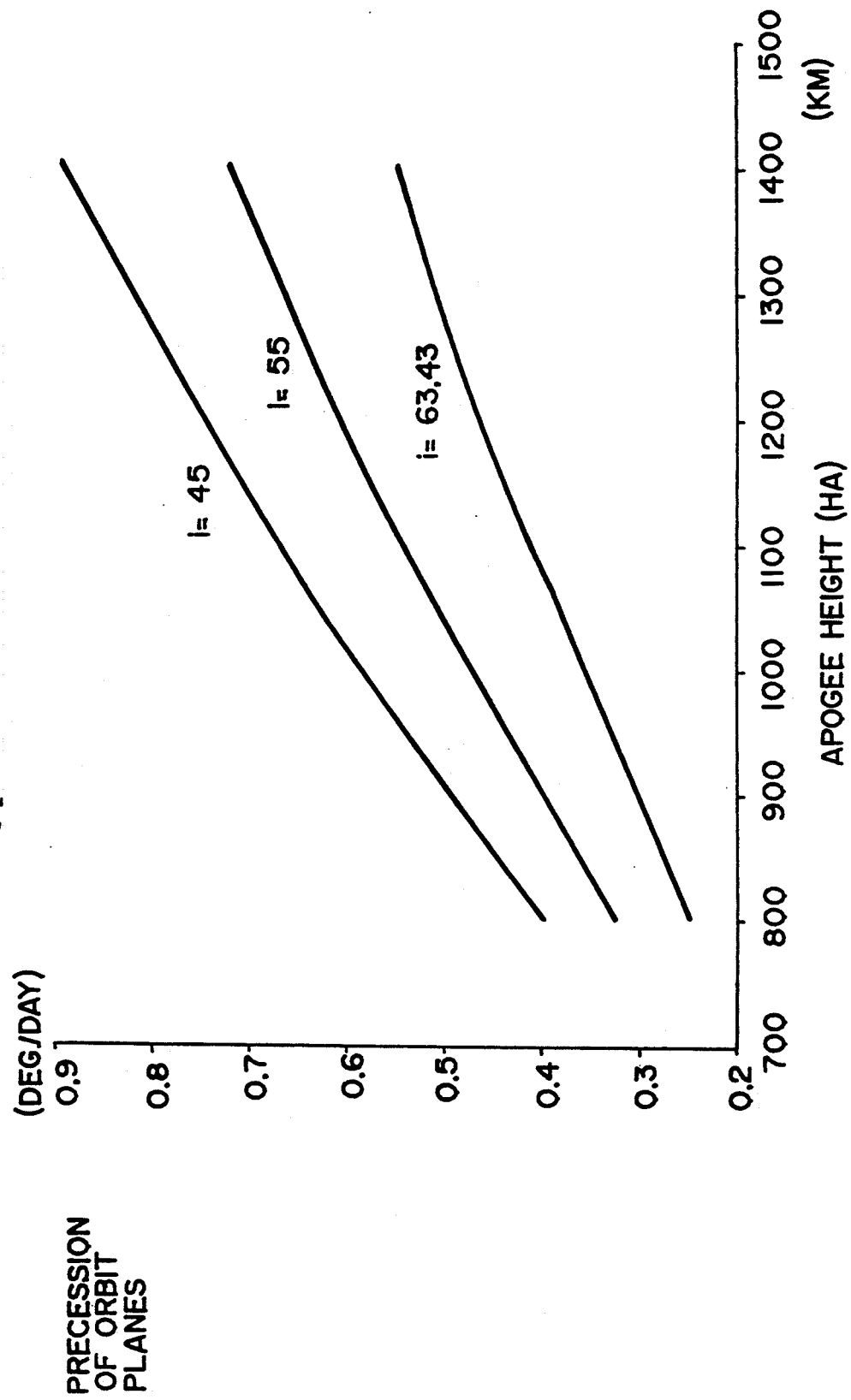

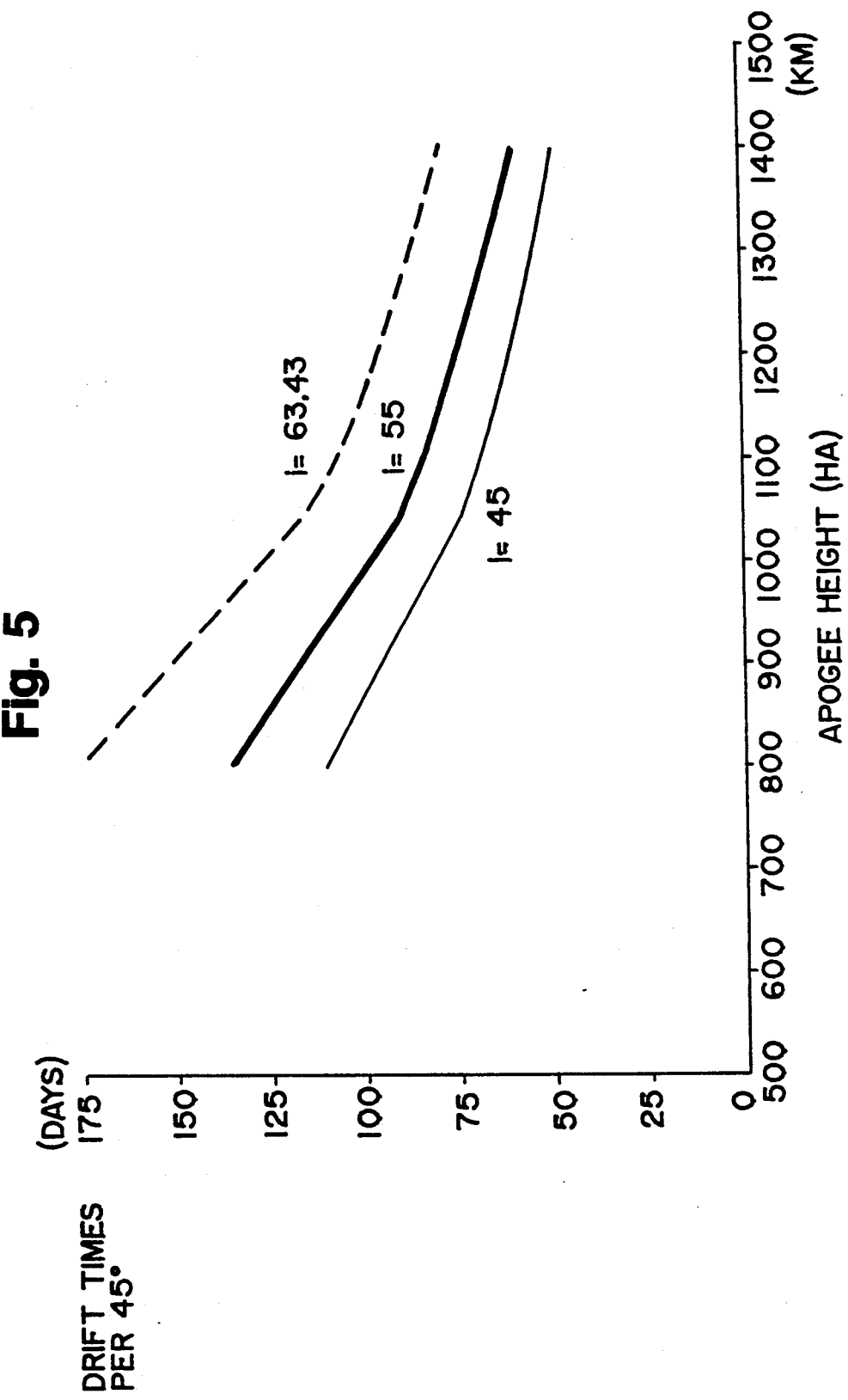

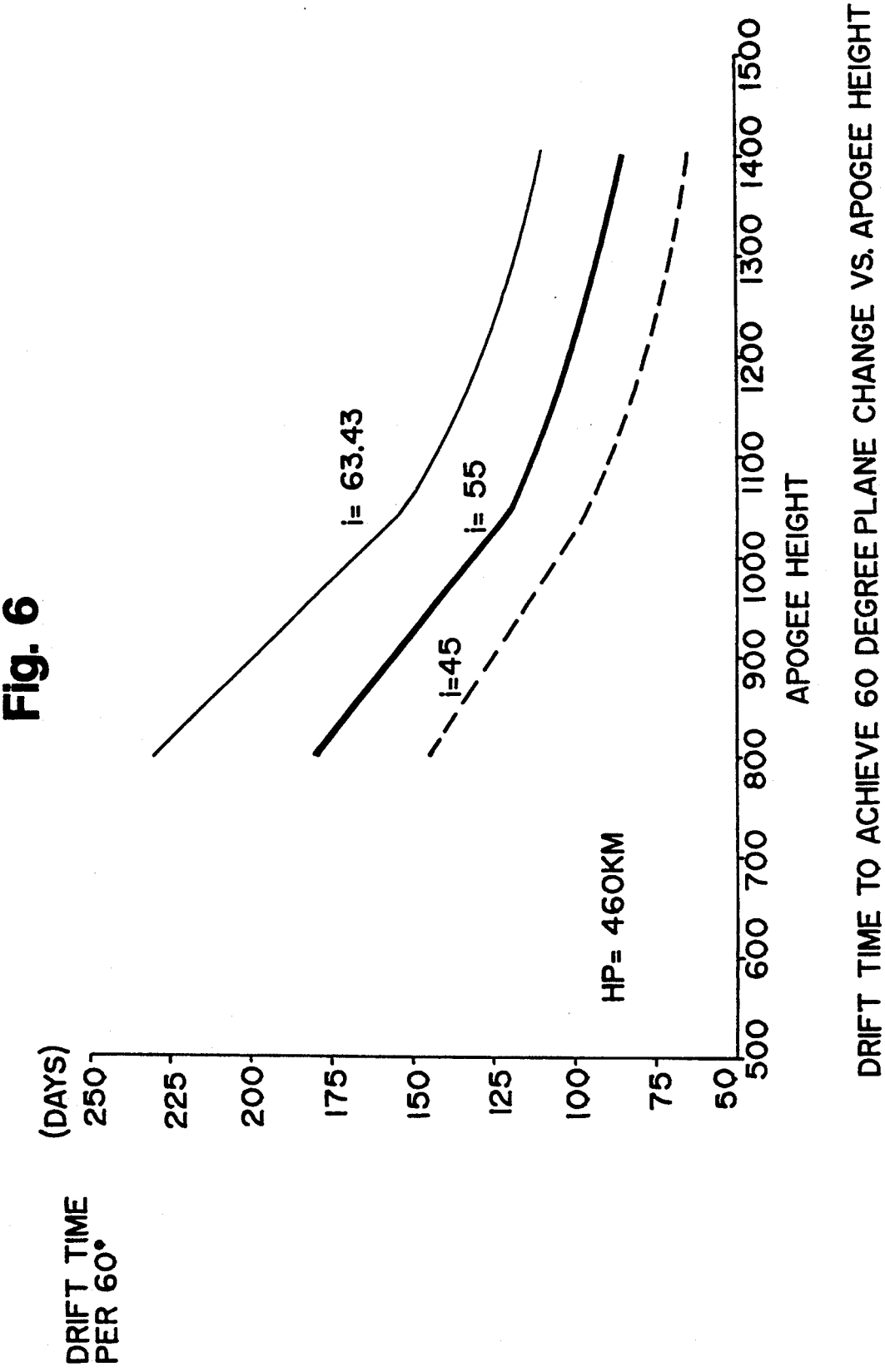

FUEL MASS FOR CIRCULARIZATION BURN VS. APOGEE HEIGHT

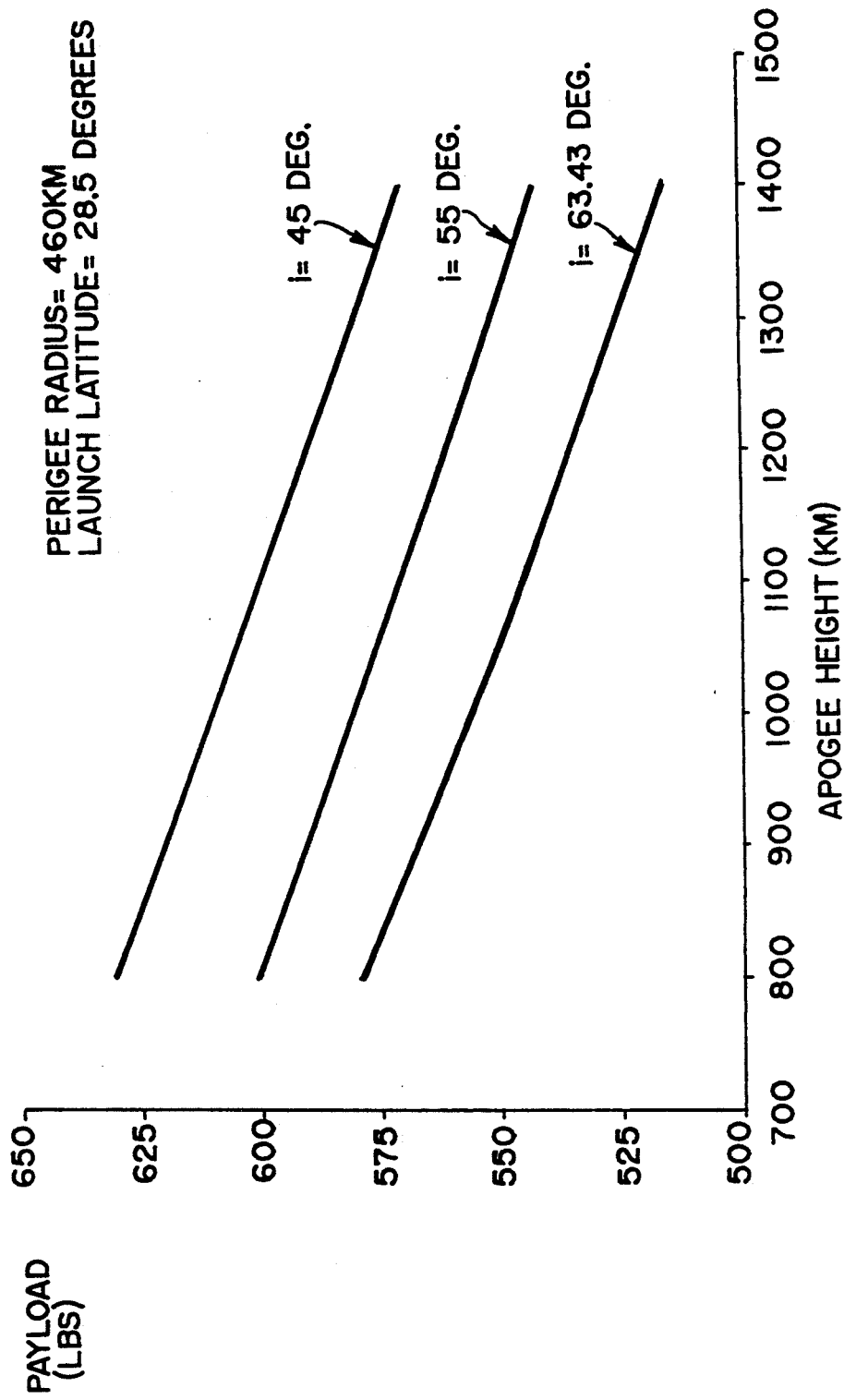

METHOD AND APPARATUS FOR DEPLOYING A SATELLITE NETWORK

The present invention relates to Earth satellites and to the establishment of orbits for networks of such satellites.

BACKGROUND

The inhomogeneous nature of the Earth's mass distribution, particularly the equatorial bulge, perturbs the orbits of all Earth satellites. Three perturbations are most prominent: (1) the orbit plane rotates around the earth in inertial space ("orbit plane precession"); (2) the orbit's line of apsides (i.e., the major axis of an elliptical orbit) rotates within the orbit plane ("apsides precession"); and (3) the orbit's radius vector oscillates about the mean orbit, causing the orbit radius to decrease at high latitudes and increase near the equator. For low Earth orbit ("LEO") spacecraft, even in elliptical orbits, the third perturbation is small and can usually be ignored, but the first two effects are quite pronounced.

Some of the fundamentals of orbital mechanics, and of Earth orbital mechanics in particular, and astronomical systems of measurement are set forth in the prior art, which includes U.S. Pat. Nos. 3,836,969 to Bond et al., 4,084,772 to Muhlfelder, 4,776,540 to Westerlund, and the references therein cited, and in A. Roy, "Orbital Motion", 3d ed., Adam Hilger, Philadelphia (1988) and J. Wertz ed., "Spacecraft Attitude Determination and Control", Kluwer Academic Publishers, Boston (1978). In those references, orbit plane precession and apsides precession are treated as effects to be eliminated by geostationary satellite station-keeping systems. In contrast as described below, the present invention exploits those effects to produce desired orbital geometries.

The successful flight in April 1990 of the first PEGASUS TM launch vehicle has verified that the price per kilogram of mass to LEO can be maintained even when the total mass of the satellite system being launched is low. The capabilities of such vehicles provide many new options to small-satellite designers that have not been considered because they have never before been available. Selections of orbits, launch windows, and deployment strategies have never been available for small satellites because they have usually been carried as secondary payloads on large launch vehicles. The advent of PEGASUS TM -class launch vehicles makes practical a distributed LEO network of multiple satellites in multiple orbit planes providing global network coverage.

Although some aspects of global satellite networks have been considered since the beginning of the space era, until now the cost of such networks has been prohibitive. By using a single PEGASUS TM -class launch vehicle for each satellite or for each orbit plane, the aggregate cost of a LEO satellite network can be of the same order of magnitude as that of conventional global geostationary satellite networks.

At the same time, technology has advanced to the point that communications and scientific payloads having commercially significant capabilities can be incorporated into spacecraft having masses as low as 10 to 20 Kg (20 to 40 lbs); such spacecraft are referred to as "micro-satellites". Although micro-satellites are much smaller than typical communication satellites, which can have masses of hundreds or thousands of kilograms, it will be appreciated that a global LEO network's value (e.g., its capacity, in the communications sense) is derived from the aggregate of the satellites, not from any single member of the satellite network. Even now, as in the past, this important point is usually missed during consideration of microsatellite designs that, despite their "cuteness," are not physically impressive.

To date, no global LEO satellite network has been put in place, although aspects of such networks have been considered, and such networks are now being proposed by a variety of commercial entities. One such proposal has recently been made by Starsys, Inc. in a public filing at the Federal Communications Commission. General aspects of satellite network configurations are described in Adams et al., "Circular Polar Constellations Providing Single or Multiple Coverage above a Specified Latitude", J. Astronautical Sci. vol. 35, no. 2, pp. 155f-192 (April-June 1987).

The usual approach taken in studying global LEO satellite networks is to assume that all satellites from a single launcher are placed in a single orbit plane; solutions are then found to distribute the satellites around the orbit plane, usually in a uniformly spaced manner. One such network is described in U.S. patent application Ser. No. 07/485,655 filed Feb. 27, 1990, for a "Mobile Satellite System" by A. Elias et al. and assigned to the assignee of the present application.

Through the present invention, however, an entire global network of micro-satellites could be deployed using a single PEGASUS TM -class launch vehicle. Indeed, a wide variety of network configurations can be implemented according to the needs of network customers and various trade-off parameters as discussed below.

One such network concept, called "geobeacon," involves the use of an ultra-precise radio location technique to determine the distance between two locations separated by a large (approximately continental) distance to an accuracy of a few centimeters. Such accuracy is comparable to that achieved with Very Long Baseline Interferometry, which is a current method used to monitor motion of the Earth's tectonic plates, and several microwave uplinks to each satellite and a single downlink would be employed to carry out the (three-dimensional) distance measurement. Nearly continuous coverage is desirable for the geobeacon concept. Since seismic equipment is typically located at the sites (estimated to be between 100 and 1000 in number) for which the distance measurements would be made, it would be possible to relay seismic data from those remote sites using the same satellite network. As described in more detail below, a network suitable for the geobeacon concept could probably be provided by 16 micro-satellites deployed by one PEGASUS TM -class launch vehicle.

Another need that could be met through the present invention is that for a network for monitoring the Earth's dynamic magnetic field. Such measurements have been carried out intermittently by dozens of spacecraft since the late 1950's, but there is a current need for continuous monitoring by a global network in a correlative fashion. By use of the present invention, a single launch vehicle could deploy the network, which might include more than 4 satellites per orbit plane in more than 4 planes and provide continuous data over many years, e.g., for at least one solar cycle (22 years).

As for the Mobile Satellite System ("MSS") described in the above-identified U.S. patent application, which is expressly incorporated into the present application by reference, use of the present invention could provide a network having about 25–33% of the communications capacity of the MSS at an estimated cost of less than about $20 million. Each satellite could support one continuous 8–10 Watt downlink and a second 10 Watt downlink for short durations, providing a commercially significant capability for several types of user. The receiver in each satellite and communication data rates and modulation formats could be those described in the MSS patent application.

SUMMARY

There is provided a method of deploying a network of a plurality of satellites in a plurality of orbit planes comprising the steps of: launching the plurality of satellites into an initial orbit having an initial orbit plane; transferring a first satellite from the initial orbit into a first orbit having a first orbit plane, wherein the initial and first orbit planes precess at predetermined initial and first rates, said initial and first rates being different by a first difference rate; transferring a next satellite into a next orbit having a next orbit plane after waiting a first time period selected based on the first difference rate, wherein the initial and next orbit planes precess at the initial and next rates, said initial and next rates being different by a second predetermined difference rate; and repeating the foregoing step after waiting a next time period selected based on the next difference rate, whereby the satellites are sequentially deployed into the plurality of orbit planes.

An apparatus for deploying a network of a plurality of satellites in a plurality of selected orbit planes comprises: means for launching the plurality of satellites into an initial orbit having an initial orbit plane; and means for sequentially transferring satellites from the initial orbit into respective ones of the plurality of orbit planes, wherein the initial and plurality of selected orbit planes precess at different predetermined rates and the transferring means transfers satellites after waiting predetermined time periods based on differences between the initial and predetermined rates, whereby the satellites are sequentially deployed into the plurality of orbit planes.

BRIEF DESCRIPTION OF THE DRAWINGS

The features and advantages of the present invention will be understood from reading the following detailed description in conjunction with the drawings in which:

FIG. 4 depicts the relationship between a difference rate of orbit plane precession and apogee height;

FIG. 5 depicts the relationship between drift time for 45 degrees orbit plane separation and apogee height;

FIG. 6 depicts the relationship between drift time for 60 degrees orbit plane separation and apogee height;

FIG. 9 depicts the relationship between payload mass and apogee height for the PEGASUS TM launch vehicle.

DETAILED DESCRIPTION

As described in more detail below, the present invention exploits the useful properties of orbit plane precession; in one aspect, it also compensates the effects of precession of the line apsides. Although the following description is given in terms of small satellites deployed by a PEGASUS TM launch vehicle, it will be appreciated that the present invention is not limited to such devices but can include large satellites deployed by large booster rockets.

Figure 1A:
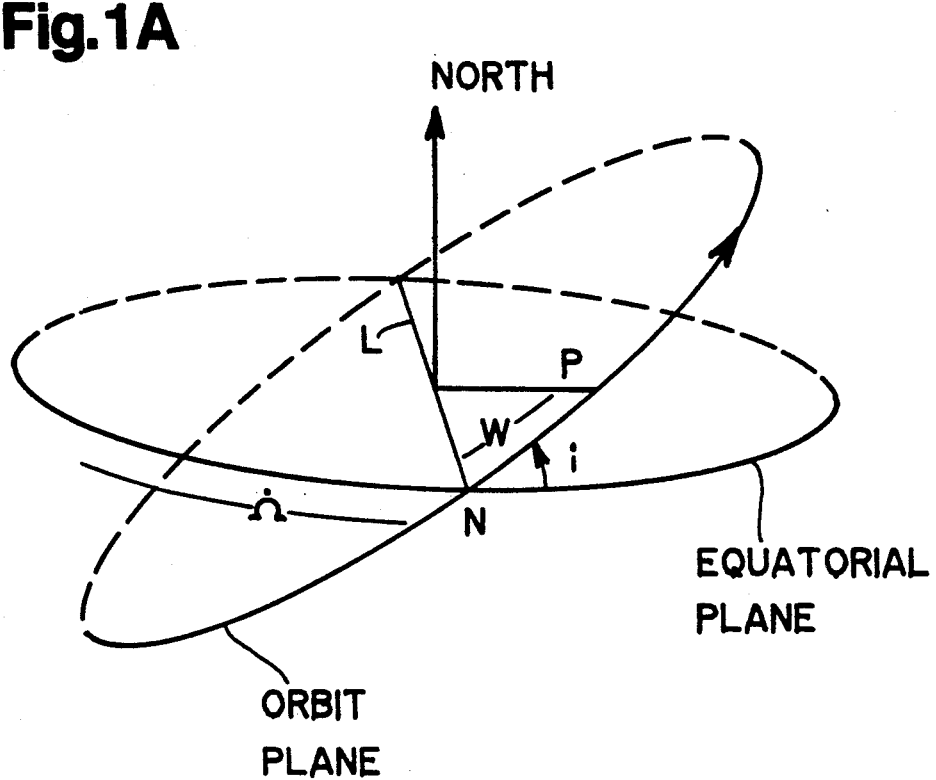
FIG. 1A is a sketch of satellite orbital geometry.
Figure 1B:
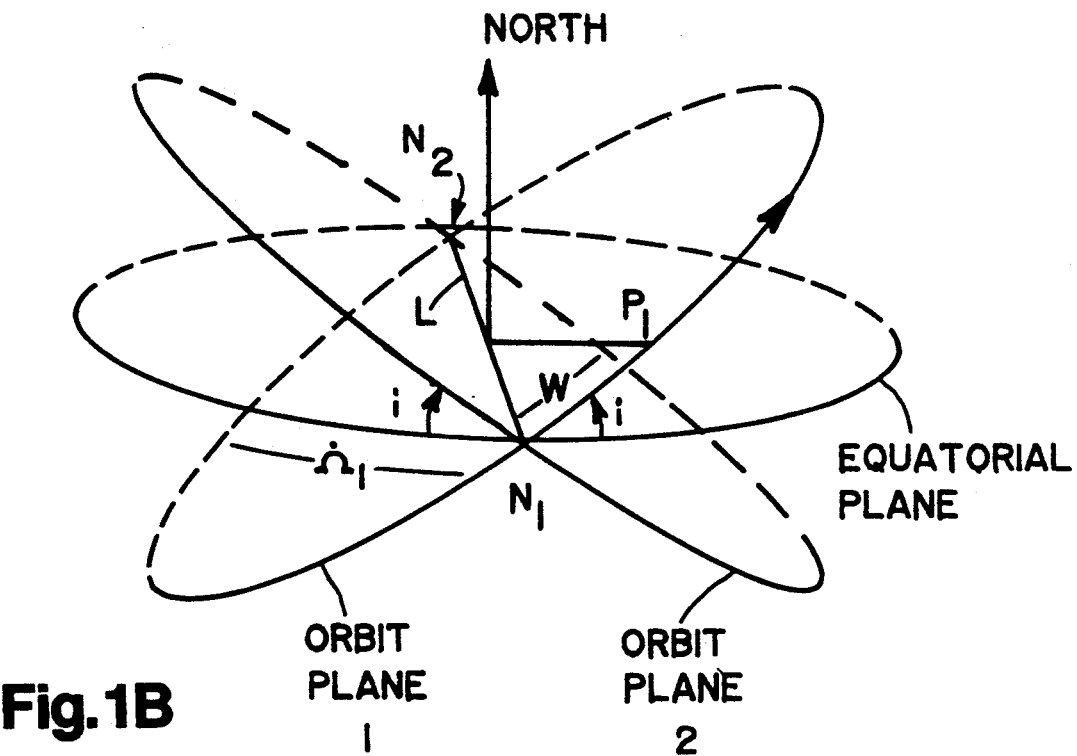
FIG. 1B is a sketch of two orbit planes achieved in accordance with the present invention.

Orbit plane precession is usually characterized as a time-rate-of-change of the Keplerian orbital element called Right Ascension of Ascending Node ("RAAN," or $\Omega$), which is a measure of the location of the point (the ascending node) in inertial space where a satellite's orbit plane crosses the Earth's equatorial plane with the satellite moving from south to north. A sketch of the orbital geometry is provided in FIG. 1A, showing the Earth's equatorial plane and the satellite's orbit plane; for a satellite orbiting in the direction of the arrow, the ascending node is indicated by N:

For Earth orbits, a useful means of expressing the RAAN derivative is the expression:

$$\frac{d\Omega}{dt} = \frac{-9.95974}{(1-\epsilon^2)^2} \cdot \left(\frac{R_e}{a}\right)^{7/2} \cdot \cos i$$

which can have units of degrees of arc per day and where $R_e$ is the Earth's radius, a is the orbit's semi-major axis (i.e., one half of the larger axis of an elliptical orbit), $\epsilon$ is the orbit's eccentricity (i.e., the ratio of the difference between the lengths of the major and minor axes of the orbit to their sum), and i is the orbit inclination (i.e., the angle between the orbit plane and the Earth's equatorial plane, shown in FIGS. 1A and 1B).

In a similar fashion, apsides precession is characterized as a time-rate-of-change of the Keplerian orbital element called, for Earth orbiting satellites, Argument of Perigee ($\omega$), which is the angle, in the satellite's orbit plane, between the ascending node N and the perigee point P, measured in the direction of the satellite's motion. The time derivative is usefully expressed by the relation:

$$\frac{d\omega}{dt} = 19.9195 \cdot \left[\left(\frac{R_e}{a}\right)^{7/2} \cdot \frac{1 - 1.25 \sin^2 i}{(1-\epsilon^2)^2}\right]$$

also in units of degrees of arc per day where $R_e$, a, $\epsilon$, and i are as defined above.

It will be appreciated by those of ordinary skill in the art that the five independent Keplerian orbital elements a, $\epsilon$, i, $\Omega$, and $\omega$ are completely sufficient to describe an orbit's size, shape, and orientation. Specification since the time of perigee passage would permit the location of the satellite along its orbit at a given time.

In the present method, orbit plane precession is used to deploy a plurality of satellites into one or more desired orbit planes and to distribute the satellites within the plane or planes into a selected configuration. As described in more detail below, although the rate of orbit plane precession (i.e., $d\Omega/dt$) is low, about the same amount of time would be needed to deploy a useful satellite network through use of the present method as would be needed for deployment into several orbit planes by multiple launch vehicles, and much of the large cost of multiple launch vehicles would be saved.

The use of the present invention in the deployment of a satellite network from a suitable launch vehicle is described below using the following terminology. The entire group of satellites deployed by the launcher is referred to as a "swarm." The launcher would transport the satellites deployed into a single orbit plane on a frame structure referred to as a "pallet." Finally, several pallets could be disposed, one on top of another, in a "stack" transported by the launcher. As described in more detail below, pallets would be separated from the stack and deployed at selected times and orbit positions.

Figure 2B:
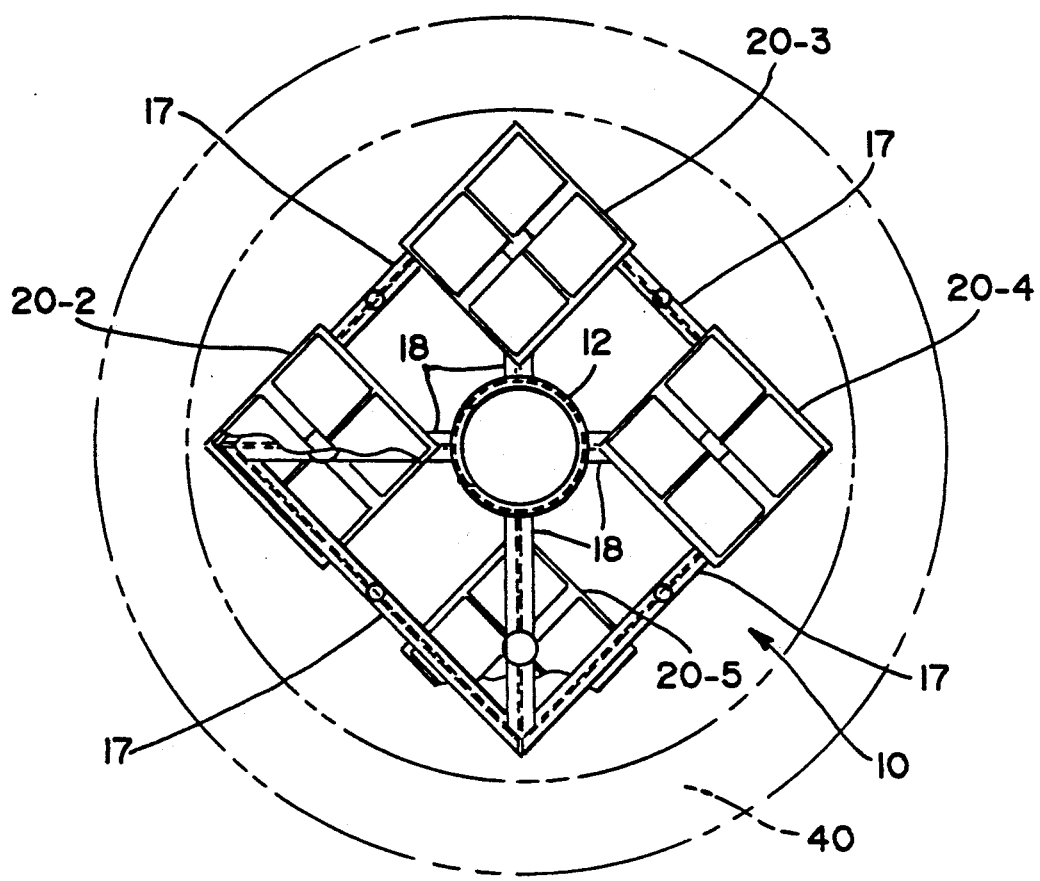
FIGS. 2A and 2B are orthogonal views of a pallet for transporting four satellites.
Figure 2A:
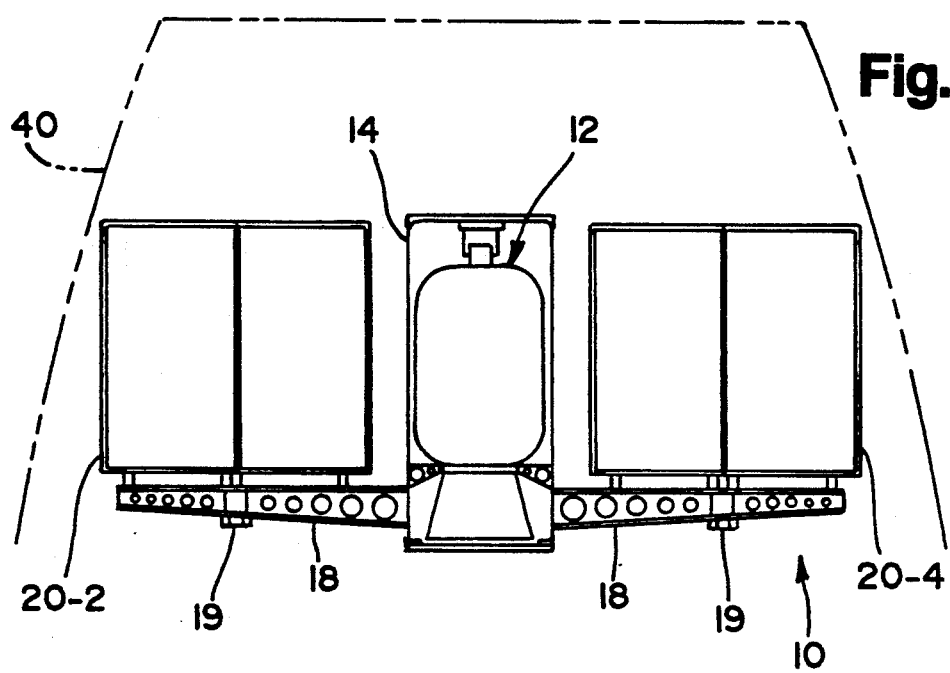
Figure 2C:
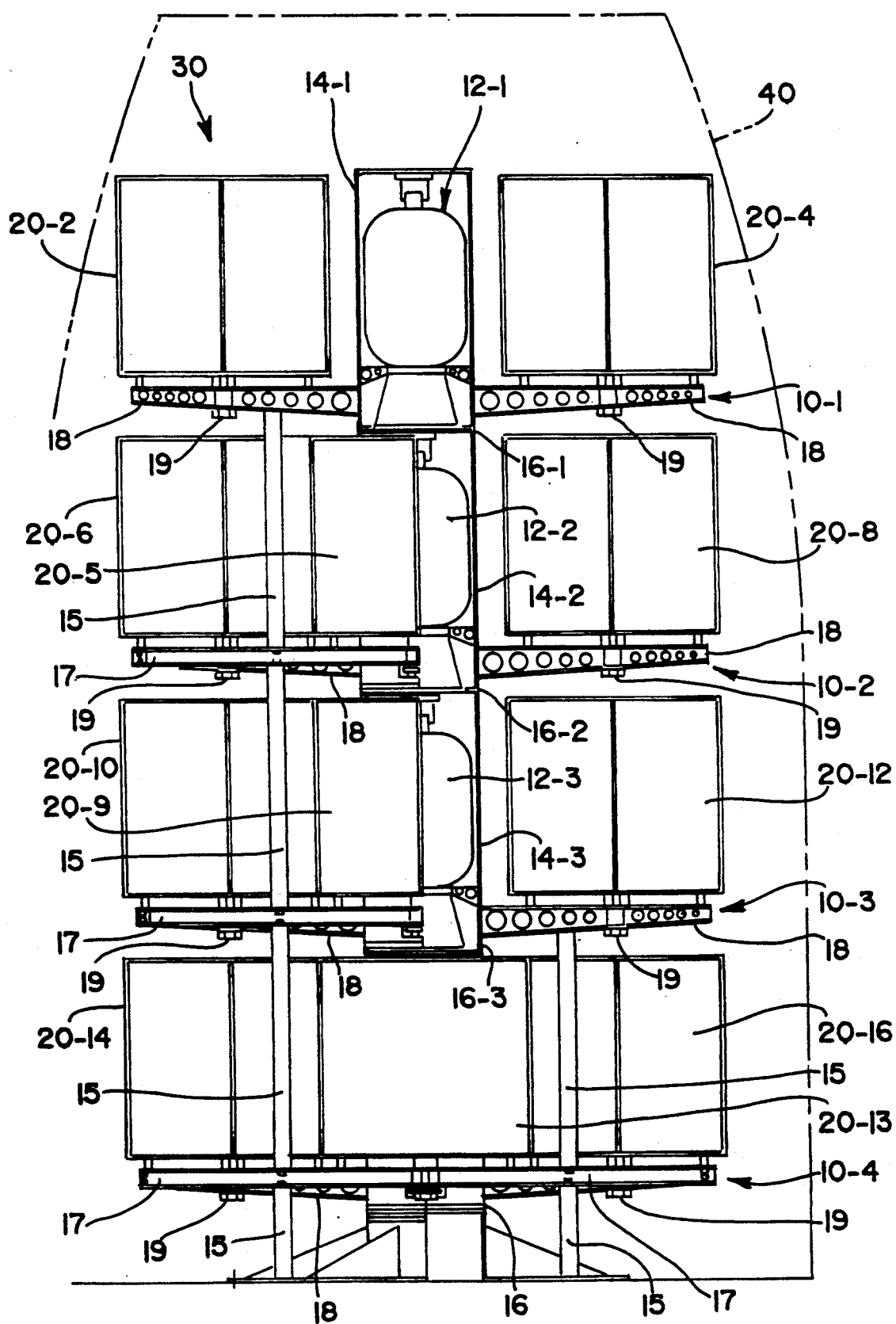
FIG. 2C is a partial cross-sectional view of a stack of sixteen satellites and four pallets and kick motors.

Referring again to the Figures in which like reference numerals indicate like parts throughout, a single pallet 10 carrying four satellites 20-1, 20-2, 20-3, and 20-4 is depicted in side cross-section in FIG. 2A and in top partial cross-section in FIG. 2B. (Satellites 20-1 and 20-3 are not shown in FIG. 2A; satellite 20-1 is not shown in FIG. 2B, but a correspondingly positioned satellite 20-5 on a lower pallet is visible.) A stack 30 of four pallets 10-1, 10-2, 10-3, and 10-4 carrying sixteen satellites 20-1 through 20-16 as it would be enclosed in a PEGASUS TM vehicle fairing 40 is shown in FIG. 2C. Launch vehicle fairing 40 is also shown in outline in FIGS. 2A and 2B. Other features of the PEGASUS TM launch vehicle are described in U.S. Pat. No. 4,901,949 to A. Elias, which is expressly incorporated by reference in the present application.

As seen in FIGS. 2A, 2B, and 2C, each pallet 10 would include a suitable kick motor 12, which would provide the propellant mass and specific impulse, $I_{sp}$, suitable for circularizing the orbit of a pallet carrying four microsatellites as described below.

Figure 3A:
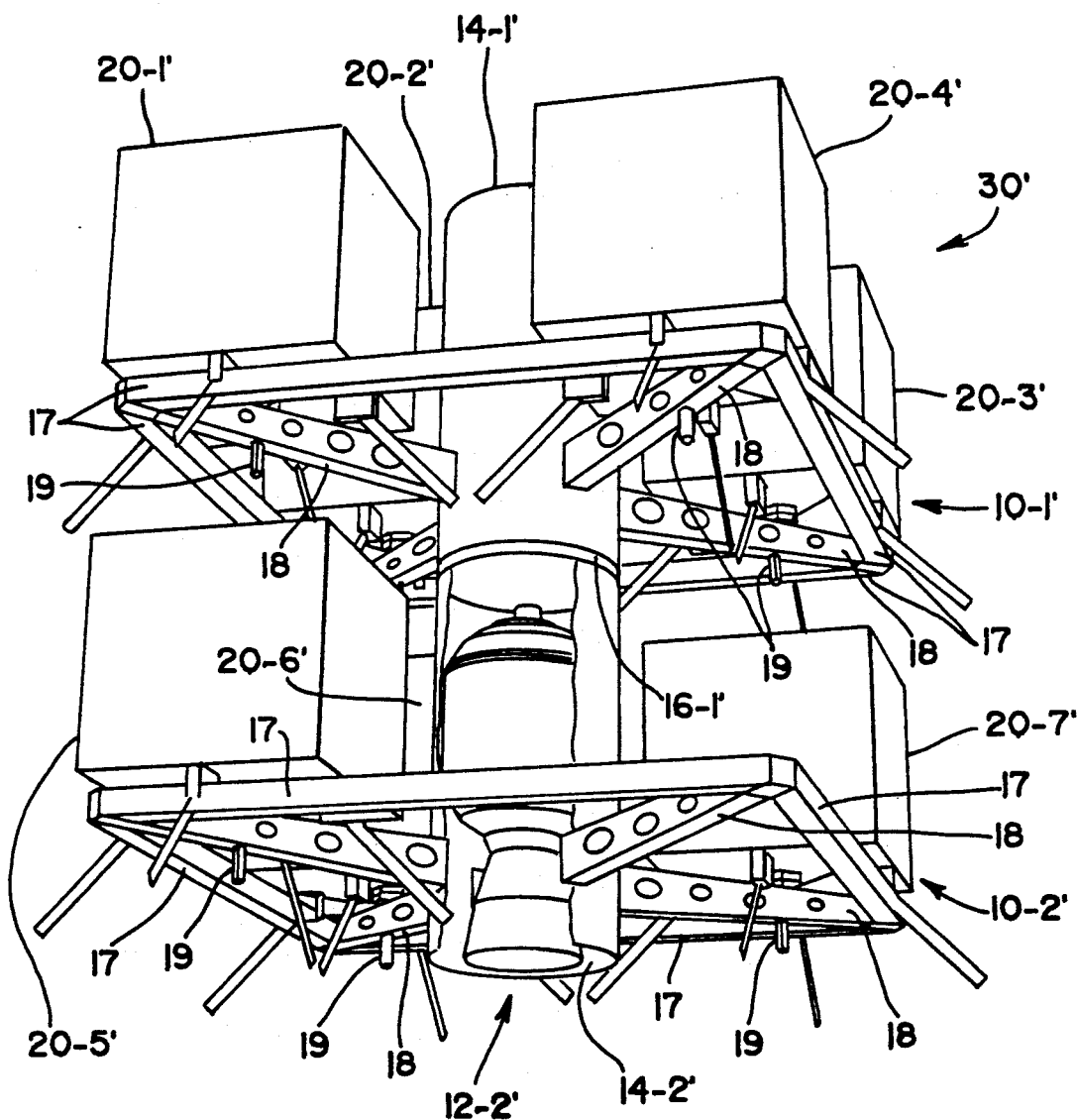
FIG. 3A is a perspective view of a stack of two pallets and kick motors.
Figure 3B:
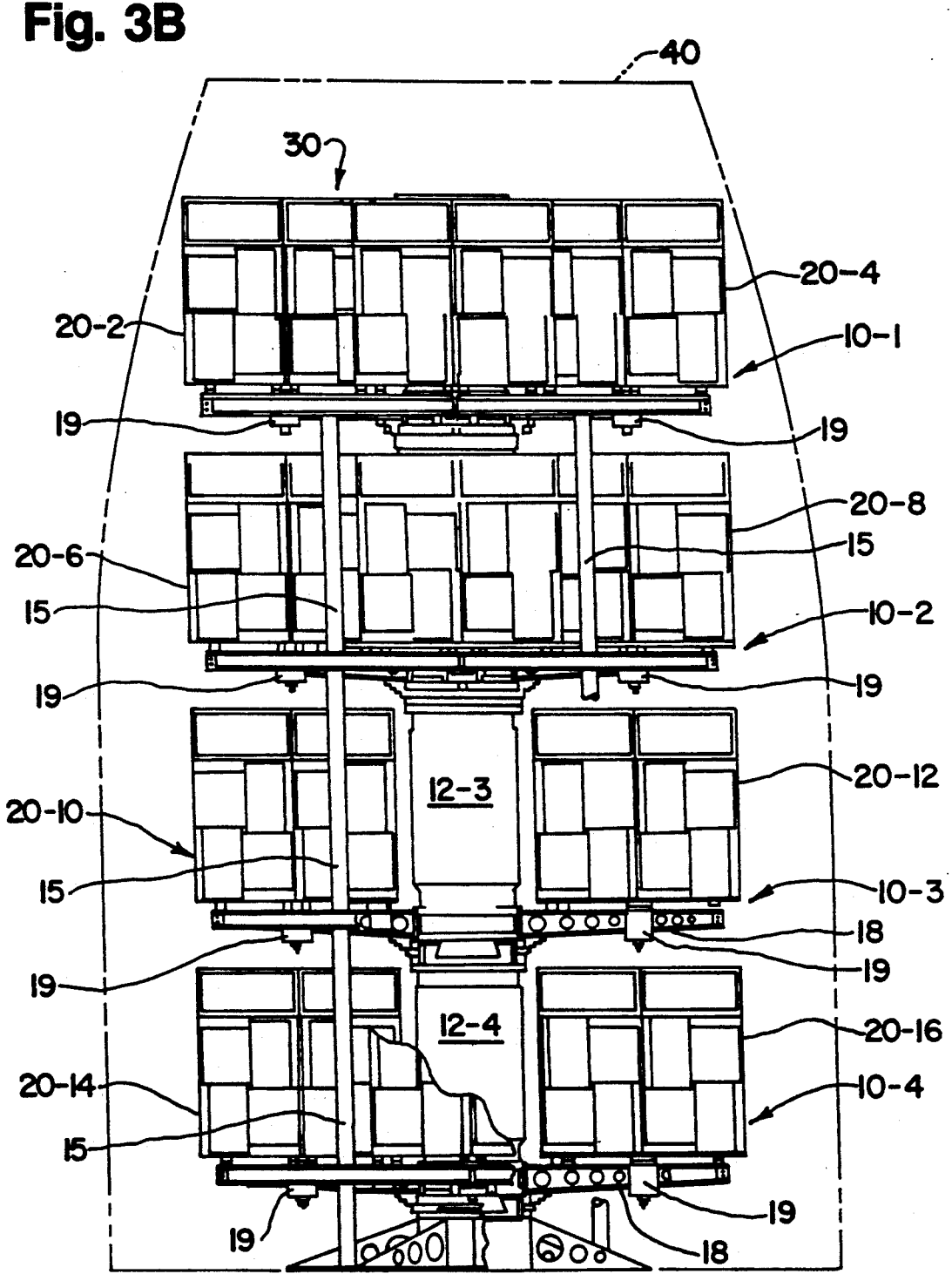
FIG. 3B is a partial cross-sectional view of a four-pallet stack in which the kick motors serve as structural elements.

Referring to FIG. 3A, there is shown a perspective view of a stack 30' of two pallets 10-1' and 10-2' carrying eight satellites 20-1' through 20-8' (Satellite 20-8' and column supports 15 are not shown in the Figure.) In FIG. 3A, kick motors 12-1' and 12-2' are shown enclosed in cylindrical covers 14-1' and 14-2', the latter being shown partially cut away for clarity. As shown in FIG. 3B, the model TE-M-790-1 (STAR 6B) kick motors 12 available from Morton Thiokol could be used directly as structural members in forming the stack, providing a stiffer pallet structure yet eliminating the cylindrical covers 14, thereby reducing the mass of the pallet and increasing the effective propellant mass fraction of the motor. Also shown in the Figures are column supports 15 that take lateral loads from the pallet structure.

It will be appreciated that the pallets are illustrated with four satellites each, but they could transport more or fewer satellites as determined by conventional size and weight considerations. Other features of the satellites, pallets, and stack are described as appropriate below.

Mission Sequence of Events

The launch inclination i of the PEGASUS TM vehicle or other launcher would preferably be selected in the middle of the range between 0 and 90 degrees, prograde (inclinations between approximately 45 and 65 degrees are particularly preferable). The preferred launch inclinations suggest an aircraft launch site from which PEGASUS TM vehicle launch azimuths to the northeast are obtainable; Wallops Island, Virginia, Cape Canaveral, Florida, and Kourou in French Guiana would be suitable aircraft launch sites. Launch sites suitable for other launch vehicles would be selected in a conventional manner.

Initial Orbit and Terminal Flight Maneuvers

For many useful satellite networks, a preferred initial launch vehicle orbit would have the following properties:

| | |
|---|---|
| Perigee Height: | 460 km (248.4 nm) minimum |
| Apogee Height: | 800 km to 1400 km, depending on mission requirements |
| Inclination: | 63.43 degrees preferred, 45 to 65 degrees acceptable depending on mission requirements |
| Argument of Perigee: | 180 degrees +/− 30 degrees |
| RAAN: | Selected such that the orbit plane contains the Earth-Sun line |

The Argument of Perigee $\omega$ given above is desirable because it provides beneficial Sun angles on the stack, but if one is willing to do stack and pallet attitude control maneuvers as necessary, this parameter could become unconstrained.

After achieving orbit, the launcher would be placed in an attitude such that its roll axis would be aligned with its velocity vector at the apogee of the achieved orbit; thus, at apogee, the vehicle's flight path angle (i.e., the angle between the roll axis and the orbital velocity vector in the orbit plane, or the pitch angle) would be zero as would the angle between the roll axis and the velocity vector perpendicular to the orbit plane (yaw). For an initial orbit having the preferred 63.43 degree inclination, the foregoing selection of a preferred launcher attitude at apogee provides the significant advantage that the launcher's roll axis and velocity vector would always remain in alignment at apogee despite the initial orbit's precessions. (For other inclinations, the roll axis and velocity vector would become misaligned by the precessions.) Thus, as described further below, roll-up of the stack and pallets need be performed only once, permitting lower attitude control system weight. It will be appreciated that achieving such a predetermined attitude could require a near-180-degree pitch or yaw maneuver of the launcher if it were near perigee when the foregoing attitude maneuver were executed.

After the foregoing preferred attitude maneuver, the launcher would be commanded to roll, preferably increasing to a rate of approximately 30 revolutions per minute, to impart gyroscopic stability to the stack and pallets during deployment. Depending on the inertia of the stack and the launcher's attitude control gas reserve available, a roll-up to the preferred angular rate might not be achievable before the launcher's control gas would be depleted. In that case, the vehicle could roll-up to the highest rate possible by expending as much of its remaining control gas supply as permitted, and further roll-up would be accomplished by attitude control systems on the stack or individual pallets.

Figure 3C:
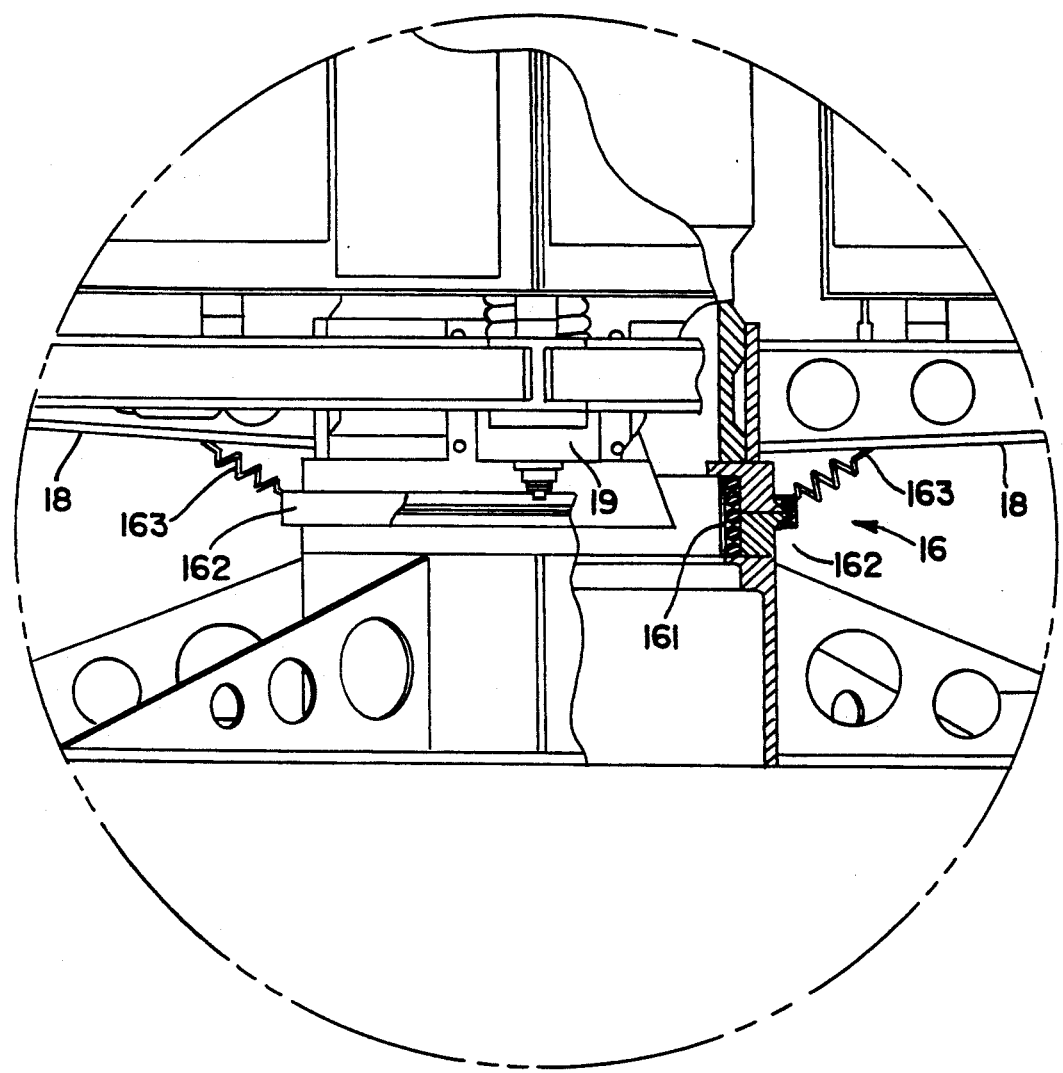
FIG. 3C is a view of a stack-launcher separation system.

After the launcher had been rolled up, the stack 30 would be separated from the launcher, and each pallet would be commanded to separate, in turn, from the top of the stack, by sequential activation of suitable means such as conventional marmon clamp separation systems 16, which are often used to releasably attach cylindrical members such as kick motor covers 14. A view of such a clamp system 16 is shown in FIG. 3C, which is a magnified view of the stack-launcher connection seen in FIG. 3B. A coil spring 161 stores the energy for separating the stack/pallet from the launcher/pallet when an explosive bolt (not shown) is released. At the same time, the halves of a clamp 162 are separated and, to avoid any damage to the separating assemblies, suitable springs 163 pull the clamp halves 162 toward the bottom of the pallet. Optimum separation spring energies would be determined in the usual way. The stack 30 would typically include from two to four pallets 10, each with its own attitude control system as described below. As described in more detail below, the times for pallet separations would be determined to deploy the pallets and satellites into selected orbits.

Pallet Components

Figure 3D:
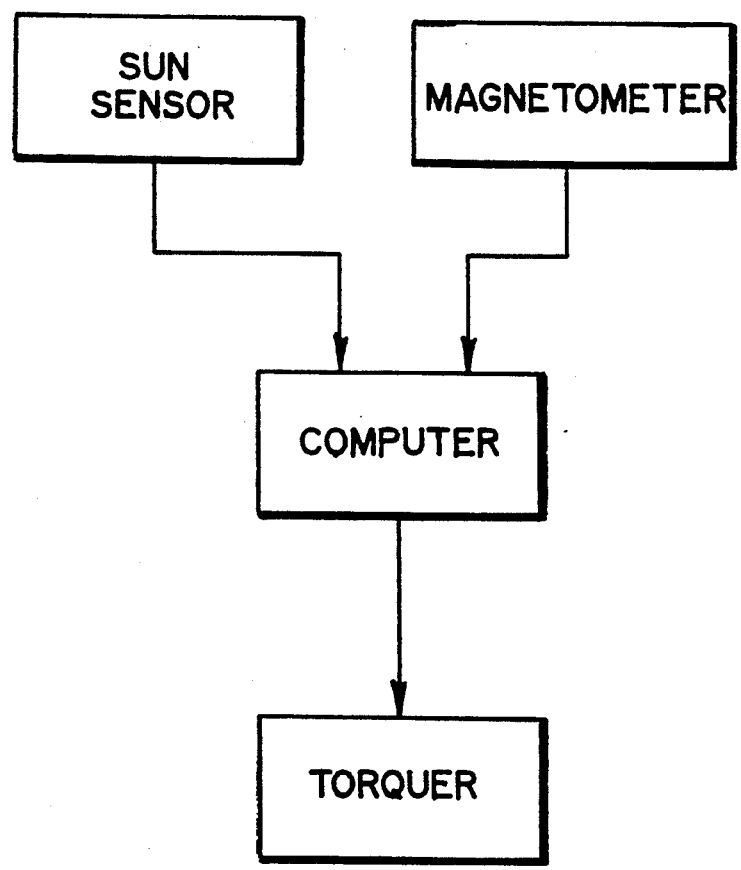
FIG. 3D is a block diagram of an attitude control system.

As illustrated in the Figures, each pallet 10 would contain the structure necessary to support multiple satellites 20 during launch, suitable kick motors 12 for circularizing the satellites' orbits as described below, and a simple attitude control system. A suitable attitude control system, shown in the block diagram of FIG. 3D, would comprise a conventional three-axis flux gate magnetometer, a conventional digital Sun sensor (e.g., an Adcole digital solar aspect sensor or equivalent), a magnetic torquer coil, and a suitably programmed computer. In a conventional way, the Sun sensor would be used to fix the orientation of the Sun and the magnetometer would be used to fix the orientation of the Earth in the spacecraft's reference frame, thereby unambiguously fixing the spacecraft's orientation in inertial space. Similar attitude control systems have been used on other spacecraft and are capable of accuracies on the order of one to two degrees.

Since the orbit inclination i (even if only 45 degrees) transitions a wide range of magnetic dip angles, a conventional single magnetic dipole torquer coil, e.g., a solenoid, would provide adequate torque for pallet attitude control maneuvers. The computer would determine in a conventional way where in the pallet's spin cycle and where in the orbit to apply electric current to the torquer coil. Such a simple attitude control system can be advantageously realized by providing the magnetometer, sun sensor, and torquer coil on each pallet, for example on the pallets' diagonal support arms 18, and using one of the flight computers located on the satellites (since as many as six satellites could be present on each pallet, one of them could be put to good use). It will be understood that entire such attitude control systems could be placed on the satellites if needed for their own attitude control.

It will be appreciated from the foregoing that a pallet is a "stable spinner" spacecraft.

The attitude control system would be used for several purposes: (1) to control the spin rate of the pallet; (2) to orient the pallet spin vector (i.e., its roll axis) so as to maintain a suitable Sun angle during the period before satellite release; and (3) to orient the pallet spin vector to the pallet's orbital velocity vector prior to kick motor firing. It will be appreciated that a body may be stabilized by rotational inertia about a spin axis, or angular momentum axis, and that some pallet stabilization would be needed to compensate the inevitable misalignment between the kick motor's thrust axis and the pallet's center of mass. Instead of the magnetic torquer, other devices, such as gyroscopes, reaction wheels, or cold gas thrusters could be used in the attitude control system.

Pallet Maneuvers

At a selected first elliptical orbit apogee, the pallet 10-1 would be separated from stack 30 by marmon clamp 16-1 and allowed to move away from the stack before firing its kick motor 14-1 (either via ground command or via flight computer command), provided that adequate gyroscopic spin stability had been achieved from the launcher's roll-up, and if necessary, additional stack or pallet roll-up. The pallet's orbital velocity change, $\Delta V$, induced by the kick motor and applied at apogee would typically be that amount appropriate to circularize the pallet's orbit at the apogee altitude of the initial orbit achieved by the launcher. Such a maneuver may be called a "single rocket motor kick to circularize orbit," and suitable $\Delta V$ and propellant mass for an example satellite system are described in more detail below. It will be understood that the kick motor could transfer the pallet into other than a circular orbit if desired, in which case the difference rate of orbit plane precession described below would be calculated accordingly.

Upon command from ground control or a flight computer, the satellites 20-1 through 20-4 on pallet 10-1 could then be separated from the pallet by conventional means such as spring mechanisms 19. Satellite-pallet separation would typically be simultaneous for all satellites on a given pallet because to do otherwise could impose expensive requirements on the pallet attitude control system. Different separation rates could be established between the satellites by using different separation spring energies, but the ability to have the pallet deploy the individual satellites around the newly established circular orbit plane is not required. This activity, which would require very little $\Delta V$ among the satellites (only a half-meter/sec can be sufficient to produce a half-orbit separation in only six months), would typically be accomplished by suitable thrusters on the individual satellites in the swarm.

It can now be recalled that the rate of orbit plane precession $d\Omega/dt$ is a function of both an orbit's eccentricity and semi-major axis. Because $\epsilon$ and a for the circularized orbit of pallet 10-1 would be different from $\epsilon$ and a for the elliptical orbit of the stack 30, the two orbits would begin to diverge in RAAN due to their different orbit plane precession rates. In accordance with a feature of the invention, the difference rate between the two precession rates, referred to as $\Delta d\Omega/dt$, is a key parameter selected for the deployment of the overall network. As described below, a practical range of $\Delta d\Omega/dt$ for LEO satellite networks is between $-0.25$ and $-0.90$ degrees per day (the sign specifies the direction in which the planes separate from one another). After a selected time period, referred to as a wait time or drift time, the difference rate will result in a separation of the circular-orbit plane of the satellites 20-1 through 20-4 and the elliptical-orbit plane of the stack 30. Such a separation is illustrated in FIG. 1B, in which orbit plane 1 represents the satellites' circular orbit and orbit plane 2 represents the stack's elliptical orbit. The subscripts relate the parameters described in connection with FIG. 1A to the orbit planes 1 and 2. It will be appreciated from the foregoing that FIG. 1B shows a special case in which the drift time was selected such that the difference rate resulted in a separation of 180 degrees between elliptical orbit plane 2 and circular orbit plane 1.

The value of the difference rate, and the number of orbit planes desired for the network, determine the wait time before the next pallet would separate from the stack fire its kick motor to circularize its orbit, and deploy its satellites. After the appropriate wait time, the second pallet 10-2 would be rolled-up to its final rate; its spin vector would be suitably directed, if necessary, as described above; and its kick motor 12-2 would be fired at orbit apogee. After kick motor shutdown, the second pallet 10-2 would be in a circular orbit moving at the same rate as pallet 10-1's satellites. The two circular-orbit planes would also precess approximately in synchronism relative to the Earth and at the rate of $\Delta d\Omega/dt$ degrees/day relative to the elliptic orbit of the stack and any remaining pallets. Pallet 10-2 would then deploy its satellites in the same manner as pallet 10-1.

The foregoing steps would then be repeated for any remaining pallet(s). After wait times of the appropriate number of days, their kick motor(s) would be fired at the initial orbit's apogee after attitude alignment, if necessary. Each pallet's satellites would be deployed, in turn, until the last pallet would have released its satellites.

It will be appreciated that the apogees of the initial elliptic orbit occur on the line of nodes, which is the line formed by the intersection of the initial orbit plane and the equatorial plane indicated by L in FIGS. 1A and 1B. Furthermore, the difference rate between orbit plane precessions for many different orbits can be used advantageously as described above to achieve desired orbital geometries. For example, the initial launcher orbit and the satellites' final orbit could both be elliptical.

Global satellite networks deployed using the present method might typically comprise four to six satellites in each of three to four orbit planes in order to provide nearly continuous global coverage. If three planes were chosen, equally spaced planes would be 60 degrees apart; if four planes were chosen, the orbit plane spacing would be 45 degrees. The range of wait times could be as short as 50 days for a network using high apogee final orbits with orbit plane spacing of only 45 degrees and as long as 231 days for low apogee final orbits with orbit plane spacing of 60 degrees.

Effects of Initial Orbit Apogee and Inclination

As described above, the orbit plane precession rate is a function of the Keplerian elements semimajor axis and eccentricity, as well as inclination. Therefore, the height of the apogee of the launcher's initial orbit and its inclination ultimately affect the difference rate $\Delta d\Omega/dt$. FIG. 4 shows the effect of apogee height ha and inclination i on $\Delta d\Omega/dt$ when the perigee height hp is held constant at 460 Km. Apogee heights below 800 km generally lead to poor Earth surface area coverage properties and require very large numbers of satellites for continuous global visibility. Satellites in orbits above 1400 km begin to suffer badly from radiation damage effects which reduce their useful lifetime. FIGS. 5 and 6 translate a $\Delta d\Omega/dt$ into drift times to achieve orbit plane separations of 45 and 60 degrees, respectively, for the same range of orbit parameters as in FIG. 4.

The rate of change of the Argument of Perigee $\omega$ described above is strongly affected by orbit inclination i. It can be noted that the foregoing equation for $d\omega/dt$ contains the term:

$$1 - 1.25 \sin^2 i$$

which becomes zero when:

$$\sin^2 i = 1/1.25$$

Therefore, the apsides precession rate can be forced to zero at the solutions of the above equation, i.e., i=63.4349 degrees and at the supplementary (retrograde) angle. This well known result has been exploited on a several space missions. If the initial elliptical orbit were selected so that the line of apsides lay near the equator ($\omega = 180$ degrees) and the inclination were 63.4 degrees, then the pallets would still have approximately the correct kick motor firing attitude (zero flight path angle) for circularization after the wait period, assuming other perturbing effects such as atmospheric drag at perigee did not substantially disturb the attitude. Also at such i and $\omega$, the Sun angles are likely to be acceptable, independent of the changes of the orbit with respect to the Earth-Sun line and without executing attitude control system maneuvers. For other values, it will be understood that the Sun angles would be superior at the beginning of the pallet deployment sequence and would become poorer with time. Therefore, as described above, an inclination of 63.4 degrees is preferred since this value "freezes" the orbit and minimizes the need for attitude control maneuvers during the waits in the initial elliptical orbit. Further, a high inclination improves the overall global coverage characteristics of a network, although at some expense to equatorial coverage and to the mass able to be launched by some launch vehicles.

The height of apogee parameter affects five major areas in the design of global satellite networks: (1) the area coverage of each satellite; (2) the radio path loss and therefore, the communications capabilities of the network; (3) the value of $\Delta d\Omega/dt$; (4) the $\Delta V$ required of the pallet kick motor and therefore the propellant mass; and (5) the amount of mass the launcher can place into the selected initial orbit.

Figure 7:
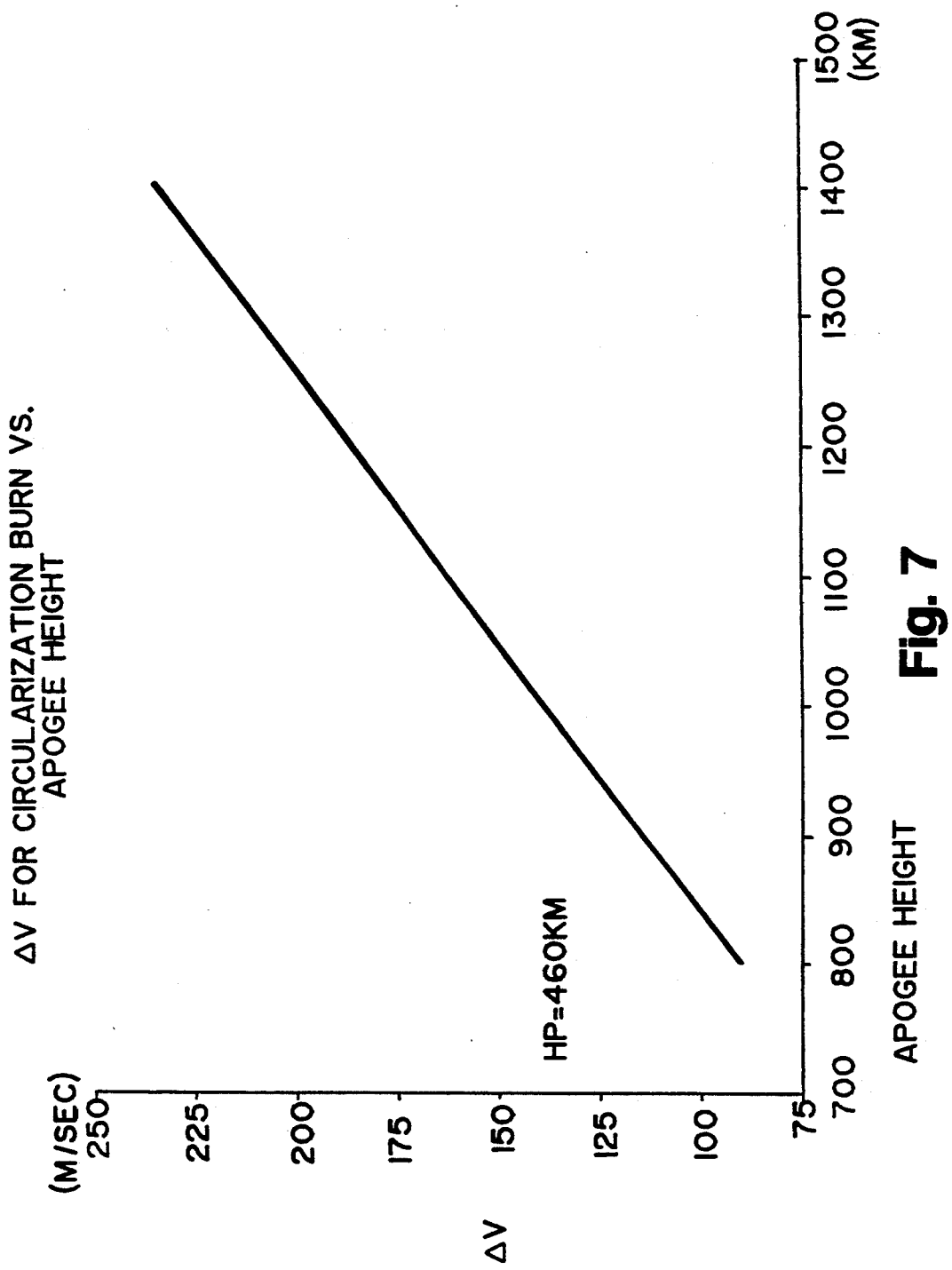
FIG. 7 depicts the relationship between orbital velocity change needed for orbit circularization and apogee height.

FIGS. 4, 5, and 6 show the effects of apogee height on $\Delta d\Omega/dt$ and the wait times to achieve plane separations of 45 and 60 degrees. FIG. 7 shows the $\Delta V$ required to circularize orbits at various heights for a constant perigee height of 460 Km. PEGASUS TM launch vehicle performance as a function of apogee height is discussed below. The effects on area coverage and path loss would be determined in conventional ways, such as those used in the Mobile Satellite System patent application referred to above In general, the highest orbit altitude (highest initial orbit apogee) that can be achieved, consistent with mission mass constraints, is the most desirable for nearly all networks.

Effects of Initial Orbit Perigee

The perigee height of the initial elliptical orbit would preferably be selected to avoid significant atmospheric drag on the pallets during the elliptica orbit wait period. The effect of such drag during the perigee portion of the orbit is to reduce the height of apogee. In the foregoing description, a perigee height of 460 Km was selected to minimize the apogee height reduction during the initial elliptical orbit wait period without significantly compromising the mission performance of a PEGASUS TM launch vehicle. It will be understood that the value of perigee height would be determined by the final area/mass and ballistic coefficients of a desired network.

An Example Network

In the following it is assumed that a particular communications system requires a global satellite network having the following characteristics:

| No. of Satellites: | 16 |
|---|---|
| Orbit Planes/Spacing: | 4/45 degrees |
| Satellites/Plane: | 4 |
| Desired Orbit Inclination: | 63.4 degrees |
| Desired Wait Time to Complete Network: | <300 days |

The four planes of satellites would be deployed in three wait periods; thus, to meet the desired wait time to completion, 300 days/3 wait periods=100 days/wait period. From the curves in FIG. 5, an altitude of approximately 1100 Km would be required for the initial orbit apogee (at an inclination of 63.43 degrees). FIG. 4 shows that the $\Delta d\Omega/dt$ value is $-0.44$ degrees/day. FIG. 7 shows that the $\Delta V$ required to circularize the initial 460 km $\times$ 1100 Km orbit is 164 m/s.

The mass of a pallet and its satellites would now be estimated. The mass of a pallet without kick motor propellant but with the motor casing (acting as a structural member) might reasonably be as follows (the numbers in parentheses refer to the Figures):

| Mass Per Pallet: | |
|---|---|
| Sat. Support Arms, 4 each (18) | 2.68 lbs |
| Support Arm Struts, 4 each (17) | 2.60 |
| Column Support, 4 each (15) | 1.08 |
| Marmon Clamp Band (16) | 0.59 |
| Separation Mech. Structure | 2.45 |
| Separation Spring, Pyros, Misc. (16) | 1.51 |
| Kick Motor Casing (STAR 6B) | 9.17 |
| Misc. Attachment Hardware | 2.00 |
| Electronics, Cabling | 3.00 |
| Total Pallet Mass | 25.08 lbs |

Figure 8:
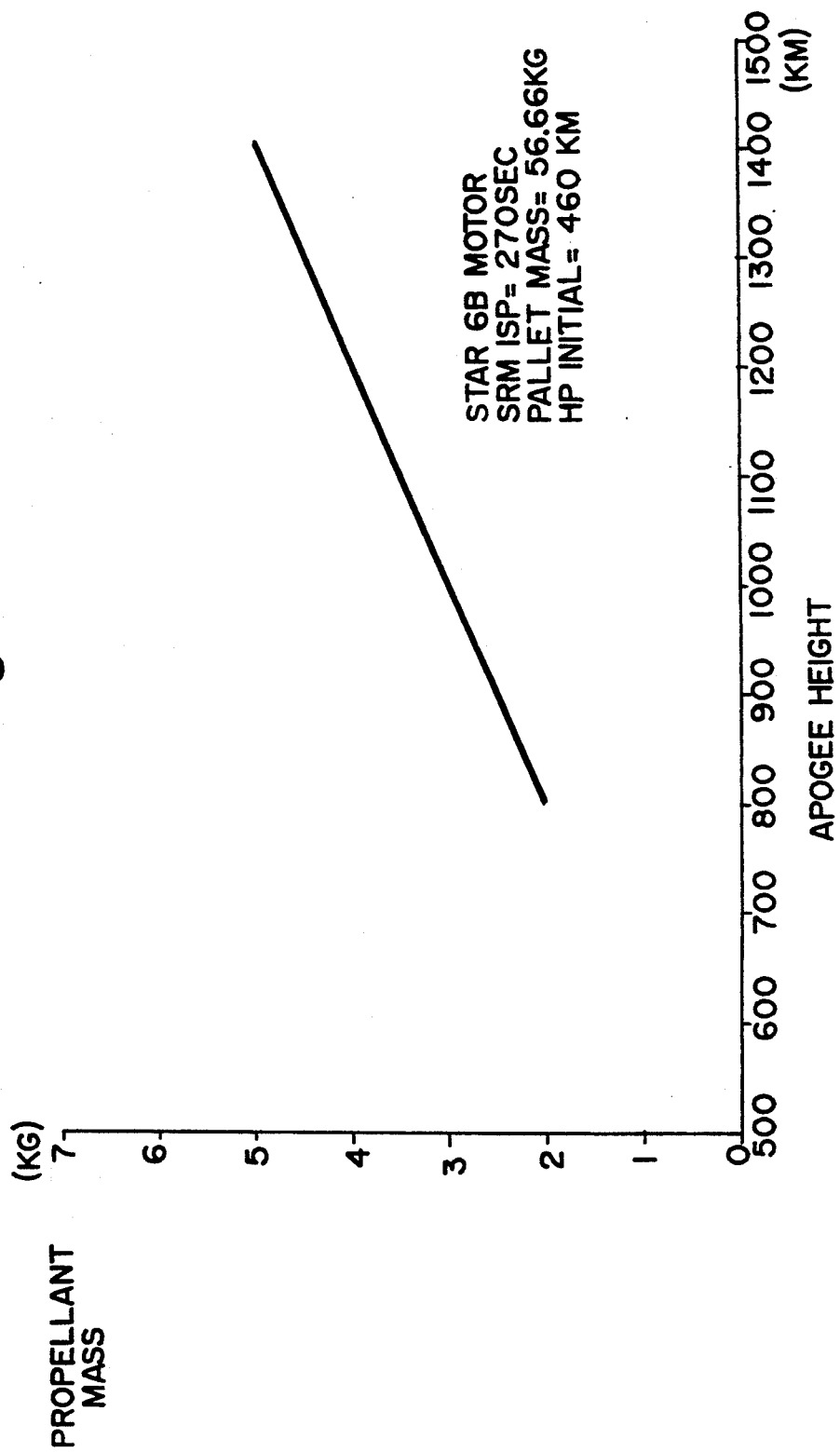
FIG. 8 depicts the relationship between kick motor propellant mass and apogee height.

It may be assumed that the mass of each micro-satellite is 25.00 lbs or 11.3 Kg. The total pallet "dry" mass for four satellites would then be 125.08 lbs or 56.66 Kg. From FIG. 6 and the well known "rocket equation," FIG. 8 shows the kick motor propellant mass that would be required to circularize the desired orbits as a function of apogee height. From the Figure, an 1100 Km apogee would require a fuel mass of 3.6 Kg, or 7.94 lbs. The final loaded pallet mass would thus be 133.02 lbs, or 60.46 Kg. It is estimated that an additional 10.8 lbs of structure would be required to mount a stack of four such pallets in the payload bay of a PEGASUS TM vehicle (see, e.g., FIG. 3C). The payload launch mass would then be 542.88 lbs, or 248.44 Kg.

Computer simulations to investigate the mass capability of the PEGASUS TM vehicle to various apogee altitudes and inclinations with a fixed initial orbit perigee of 460 Km have been summarized in FIG. 9. The simulations assumed performance and trajectory data that did not reflect the vehicle's actual performance in its April 1990 flight nor any performance improvements. The drop point for the PEGASUS TM vehicle was assumed to be 28.5 deg. N, consistent with a launch from Cape Canaveral, Florida. From the Figure, the mass that a PEGASUS TM vehicle can place into the desired initial orbit of 460 Km $\times$ 1100 Km $\times$ 63.43 degrees is 545 lbs, somewhat more than that estimated for the example network.

Mission and Network Variations

The pallet and stack approach to launching a LEO network can fit a variety of network options depending on their requirements. It would also be possible to divide the capacity of the launch vehicle among several users, each with multiple satellites. The following possibilities have been considered:

| No. Pallets: | Sats. Per Pallet: | Mass Per Pallet: |
|---|---|---|
| 2 | 2 | 255 lbs |
| 2 | 4 | 255 |
| 2 | 6 | 255 |
| 3 | 2 | 160 lbs |
| 3 | 4 | 160 |
| 3 | 6 | 160 |
| 4 | 2 | 118 lbs |
| 4 | 4 | 118 |
| 4 | 6 | 118 |
| 4 | 8 | 118 |

The listed Masses Per Pallet correspond to the available mass for all of the satellites on the pallet plus the mass of the kick motor propellant. The initial orbit assumed for the table is 55 degrees inclination and apogee height of 1000 km.

Other Considerations

One argument often raised against deploying multiple satellites with a single launcher is related to the risk of launch failure (i.e., the old problem of putting all your eggs in one basket). In the case of a network of microsatellites, however, they would be small eggs. A rule-of-thumb which is sometimes used for space missions is that the cost of the payload being launched should not exceed the cost of the launch vehicle itself. Current launchers like the Ariane vehicle, however, typically carry payloads valued in excess of twice the launcher value. Applying this sort of rule to a PEGASUS TM launch vehicle, the aggregate payload should not be valued at more than about $8 million to $16 million, depending on one's willingness to accept risk. It has been estimated that such an amount could cover the costs of a network of micro-satellites.

While 300 days to deploy a satellite network might sound like a very long time, one must consider that networks of this type have never been used before. The ground terminal logistics requirements would not be insignificant, and ground terminal operators would experience a long learning curve that would need to be completed before operational status of the network could be achieved. Thus, it could be advantageous for the operators to have to deal with only ¼ or ½ of the satellite network on the first day after launch followed in 100 days by the second fraction of the network, and so on.

Similarly, it is unlikely that deploying an equivalent network by launching each of several vehicles to the several different orbit planes (as one example) would occur much faster than deployment through a difference rate between orbit plane precessions.

It will be understood that the foregoing description of the present invention is intended in all senses to be illustrative and not restrictive. Modifications will occur to those of ordinary skill in the art to which the present invention pertains, and those modifications that fall within the spirit and scope of the invention, as it is defined by the appended claims, are intended to be included therein.

What is claimed is:

1. A method of deploying a network of a plurality of satellites in a plurality of orbit planes comprising the steps of:
   launching the plurality of satellites into an initial orbit having an initial orbit plane;
   transferring a first satellite from the initial orbit into a first orbit having a first orbit plane, wherein the initial and first orbit planes process at a predetermined initial and first rates, respectively, said initial and first rates being different by a first difference rate;
   transferring a next satellite from the initial orbit into a next orbit having a next orbit plane after waiting a first time period selected based on the first difference rate, wherein the initial and next orbit planes precess at the initial rate and a predetermined next rate, respectively, said initial and next rates being different by a next difference rate; and
   repeating the foregoing step after waiting a next time period selected based on the next difference rate, whereby the satellites are sequentially deployed from the initial orbit plane into the plurality of orbit planes.

2. The method of claim 1, wherein the initial orbit is elliptical, the initial orbit plane has an inclination of substantially 63.4 degrees, and the first and next orbits are circular.

3. The method of claim 2, wherein the transferring steps are initiated when the satellites are at the apogee of the initial orbit.

4. The method of claim 3, further comprising the steps of rotating the satellites about a roll axis and aligning the roll axis with the satellites' direction of motion at apogee before carrying out the transferring steps.

5. An apparatus for deploying a network of a plurality of satellites in a plurality of selected orbit planes comprising:
   means for launching the plurality of satellites intoa n initial orbit having an initial orbit plane processing within an initial rate; and
   means for sequentially transferring each of the plurality of satellites from the initial orbit into a respective one of the plurality of orbit planes, wherein each of the plurality of selected orbit planes precesses at a predetermined rate different from the initial rate and the transferring means transfers each satellite after waiting a predetermined time period based on the difference between the initial rate and the predetermined rate of the respective orbit plane, whereby the satellites are sequentially deployed into the plurality of orbit planes.

6. The apparatus of claim 5, further comprising means for rotating the satellites about a roll axis and means for aligning the satellites' roll axis with the satellites' direction of motion at the apogee of the initial orbit.

7. The apparatus of claim 5, wherein the transferring means further comprises a stack of a plurality of pallets and means for separating the stack from the launching means, each pallet supporting at least one of the plurality of satellites and comprising means for separating the pallet from the stack, a kick rocket motor for transferring the pallet from the initial orbit to one of the selected orbit planes, and means for separating the at least one satellite from each pallet after the pallet has been transferred to a selected one of the plurality of orbit planes.

8. The apparatus of claim 7, wherein each pallet further comprises means for controlling the attitude of the pallet.

9. The method of claim 1, wherein the first and next difference rate are substantially equal.

10. The method of claim 9, wherein the satellites are transferred from the initial orbit to the first orbit and each next orbit by circularizing the orbit of the satellites when they are at the apogee of the initial orbit.

11. The method of claim 9, wherein the satellites are transported into the initial orbit on a plurality of pallets, with at least two satellites carried on each pallet, and the pallets are mounted in a stack.

12. The method of claim 11, wherein all of the satellites carried on each pallet are deployed in a single one of the plurality of orbital planes.

13. The method of claim 1, wherein the initial orbit is elliptical and the initial orbit plane has an inclination of between 45 and 65 degrees.

14. The method of claim 1, wherein the argument of the perigee is between 150 degrees and 210 degrees.

15. The method of claim 14, wherein the Right Ascension of Ascending Node of the orbit is selected such that the initial orbit plane contains the Earth-Sun line.

16. The apparatus of claim 7, wherein each pallet is supporting two or more of the plurality of satellites.

17. The apparatus of claim 7, wherein each kick rocket motor further comprises a structural element of the respective pallet to which it is mounted.

18. The apparatus for deploying a network of a plurality of satellites of claim 8, wherein the means for controlling the attitude further comprises means for rotating the pallet about a roll axis, and means for aligning the roll axis with the pallet's direction of motion at apogee before the kick rocket motor transfers the pallet from the initial orbit to one of the selected orbit planes.

19. A method of deploying a network of a plurality of satellites comprising:
   mounting the plurality of satellites on at least two pallets, each having a propulsion means;
   launching the at least two pallets into an initial elliptical orbit having an initial orbit plane; and
   sequentially transferring each of the at least two pallets from the initial orbit into a next orbit having a next orbit plane by operating the propulsion means of each pallet.

20. The method of deploying a network of a plurality of satellites of claim 19, further comprising the steps of rotating each pallet about a roll axis and aligning the roll axis with the velocity vector of the pallet at apogee before carrying out the transferring step.

21. The method of deploying a network of a plurality of satellites of claim 20,
   wherein the inclination of the initial orbit plane is such that the roll axis and velocity vector of each pallet remain substantially in alignment at apogee as the initial orbit plane precesses.

22. A method of deploying a plurality of satellites in a plurality of orbit planes comprising the steps of:
   mounting at least one of the plurality of satellites on each of a plurality of pallets;

mounting the plurality of pallets in a stack;

launching the stack of pallets into an initial orbit in an initial orbit plane precessing at a predetermined initial precession rate;

separating a first pallet from the stack and applying thrust to transfer the first pallet from the initial orbit to a first orbit in a fist orbit plane precessing at a predetermined first precession rate, the initial and first precession rates not being equal;

separating the at least one satellite mounted on the first pallet from the first pallet;

waiting a predetermined time based upon the difference between the initial and first precession rates and then separating a next pallet from the stack and applying thrust to the next pallet to transfer it to a next orbit in a next orbit plane processing at a predetermined next precession rate, the initial and next precession rates not being equal;

separating the at least one satellite mounted on the next pallet from the next pallet; and repeating the foregoing steps of waiting a predetermined time, separating a next pallet from the stack, applying thrust to the next pallet, and separating the at least one satellite from the next pallet until all of the pallets have been separated from the stack and all of the satellites have been separated from the pallets.

23. The method of claim 22 wherein a plurality of satellites are mounted on at least one of the pallets and all of the satellites mounted on the at least one pallet are separated from the pallet simultaneously.

24. The method of claim 22 wherein the first precession rate and each next precession rate are substantially equal.

25. The method of claim 22 wherein the initial orbit is elliptical and the first and next orbits are circular, and wherein the pallets are transferred from the initial orbit to the first and next orbits by sequentially circularizing the orbit of each respective pallet when it is at the apogee of the initial orbit.

26. The method of claim 25 wherein the stack is caused to rotate about a roll axis and the inclination of the initial orbit plane is such that the roll axis and velocity vector of the stack remain substantially in alignment at apogee as the initial orbit plane precesses.

27. The method of claim 25 wherein each pallet is caused to rotate about a roll axis and the roll axis and velocity vector of the pallet are caused to be in alignment at apogee prior to circularizing the orbit of the pallet.

28. Apparatus for deploying a plurality of satellites from an initial orbit into a plurality of orbits comprising:

a plurality of pallet means, at least one of the plurality of satellites being carried by each of said pallet means;

a plurality of kick motor means, one of said kick motor means being carried by and providing thrust for each of said pallet means, wherein each said kick motor means provides thrust in response to a respective thrust command signal;

stack means for securing said plurality of pallet means together in the initial orbit;

a plurality of pallet separation means, one of said pallet separation means being adapted for separating each of said pallet means from said stack means in response to a respective pallet separation command signal;

a plurality of satellite separation means, one of said satellite separation means being carried by each of said pallet means and being adapted for separating from said pallet means said satellites carried by said pallet means in response to a respective satellite separation command signal; and control means for providing the pallet separation command signal to each of said pallet separation means, the thrust command signal to each of said kick motor means, and the satellite separation command signal to each of said satellite separation means.

29. The apparatus as claimed in claim 28 wherein said control means provides said pallet separation command signal to only one of said pallet separation means at a time and wherein said control means provides said thrust command signal to each of said kick motor means after said pallet means by which said kick motor means is carried has been separated from said stack means by said pallet separation means.

30. The apparatus as claimed in claim 28 wherein said control means provides said satellite separation command signal to said satellite separation means carried by each of said pallet separation means at a predetermined time after said control means has provided said thrust command signal to said kick motor means mounted on said pallet means by which said satellite separation means is carried.

31. The apparatus as claimed in claim 28 wherein each of said pallet means further comprises attitude control means for controlling the attitude of said pallet means by which it is carried.

32. The apparatus as claimed in claim 28 wherein said stack means further comprises attitude control means for controlling the attitude of said stack means.

33. The apparatus as claimed in claim 28 wherein said satellite separation means separates the satellites from said pallet means by which they are carried at unequal separation rates, whereby the satellites become separated within the same orbit.

34. The apparatus as claimed in claim 33 wherein said satellite separation means further comprises spring means associated with each satellite, each spring means imparting a predetermined amount of energy to the associated satellite upon separation from said pallet means.

35. The apparatus as claimed in claim 28 wherein said control means provides said pallet separation command signals to each of said pallet separation means sequentially at predetermined time intervals, said time intervals being selected based upon a difference in the rate at which the orbit of each said pallet means that has been separated from said stack precesses and the rate at which the orbit of the stack precesses.

36. The apparatus as claimed in claim 28 wherein said control means further comprises a flight computer on board one of the plurality of satellites.

* * * * *

UNITED STATES PATENT AND TRADEMARK OFFICE
CERTIFICATE OF CORRECTION

PATENT NO. : 5,199,672       Page 1 of 2

DATED : April 6, 1993

INVENTOR(S) : Jan A. King et al

It is certified that error appears in the above-identified patent and that said Letters Patent is hereby corrected as shown below:

On the title page: Item[56] Other Publications

Under "OTHER PUBLICATIONS":
      First publication, delete "Shibyama" and insert therefor --Shibayama--

Under "ABSTRACT":
      Line 11, after "orbit" delete "to" and insert therefor --into--

Column 1, line 13, delete "(I)" and insert therefor --(1)--

Column 2, line 5, delete "microsatellite" and insert therefor --micro-satellite--;line 17, delete "155f-192" and insert therefor --155-192--

Column 4, line 33, after "N" delete the colon ":" and insert therefor a period --.--

Column 5, line 46, delete "microsatellites" and insert therefor --micro-satellites--

Column 8, line 16, delete "16-I" and insert therefor --16-1--

Column 9, line 14, after "stack" insert a comma --,--

UNITED STATES PATENT AND TRADEMARK OFFICE
CERTIFICATE OF CORRECTION

PATENT NO. : 5,199,672

DATED : April 6, 1993

INVENTOR(S) : Jan A. King et al

It is certified that error appears in the above-identified patent and that said Letters Patent is hereby corrected as shown below:

```
Column 10, line 19, before "several" delete "a"; lines
57-58, delete "appliation" and insert therefor --
application--; line 58, after "above" insert a period
--.--; and line 66, delete "elliptica" and insert
therefor --elliptical--
Column 12, line 59, delete the hyphen "-" between
"could" and "be"
Column 13, line 17, after "process at" delete "a"; line
47, delete "into an" and insert therefor --into an--;
ine 48, delete "processing" and insert therefor --
precessing--; and line 49, before "initial" insert --at
an--
Column 15, Line 16, delete "processing" and insert
therefor --precessing--
```

Signed and Sealed this

Seventh Day of December, 1993

BRUCE LEHMAN

*Commissioner of Patents and Trademarks*

*Attest:*

*Attesting Officer*